US012197207B2

(12) United States Patent
Takács

(10) Patent No.: US 12,197,207 B2
(45) Date of Patent: Jan. 14, 2025

(54) ADAPTIVE VIRTUAL DEAD MAN'S SWITCH FOR SAFE OPERATION OF AUTONOMOUS SYSTEMS

(71) Applicant: Telefonaktiebolaget LM Ericsson (publ), Stockholm (SE)

(72) Inventor: Attila Takács, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 226 days.

(21) Appl. No.: 17/904,288

(22) PCT Filed: Feb. 24, 2020

(86) PCT No.: PCT/IB2020/051562
§ 371 (c)(1),
(2) Date: Aug. 15, 2022

(87) PCT Pub. No.: WO2021/171056
PCT Pub. Date: Sep. 2, 2021

(65) Prior Publication Data
US 2023/0073112 A1    Mar. 9, 2023

(51) Int. Cl.
*G05D 1/00*    (2024.01)
*G08C 17/02*   (2006.01)

(52) U.S. Cl.
CPC ........... *G05D 1/0022* (2013.01); *G08C 17/02* (2013.01)

(58) Field of Classification Search
CPC ...... G05D 1/0022; G08C 17/02; G08C 17/00; H04W 4/44
See application file for complete search history.

(56) References Cited

U.S. PATENT DOCUMENTS

| 10,438,494 | B1* | 10/2019 | Hahn | G08G 5/0013 |
| 2019/0271991 | A1* | 9/2019 | Dulmage | G08G 1/22 |
| 2019/0354111 | A1* | 11/2019 | Cheng | G05D 1/0011 |
| 2020/0175882 | A1* | 6/2020 | Singh | G05D 1/0022 |

(Continued)

FOREIGN PATENT DOCUMENTS

WO    2019025919 A1    2/2019

OTHER PUBLICATIONS

International Search Report and Written Opinion for Application No. PCT/IB2020/051562, Jul. 10, 2020, 11 pages.

(Continued)

*Primary Examiner* — Ashley L Redhead, Jr.
(74) *Attorney, Agent, or Firm* — Nicholson De Vos Webster & Elliott LLP

(57) ABSTRACT

A method for managing a robotic system includes determining connection performance metrics indicating current performance characteristics of a connection with a remote-control center; determining a safety envelope description from a set based on the connection performance metrics, wherein each description includes a mapping of connection performance metrics to operational parameters defining operating parameters for the system, and the determined safety envelope description maps the connection performance metrics to first operational parameters. The method further includes determining that the first operational parameters differ from second operational parameters currently being used by the system; and applying the first operational parameters to govern operation of the system.

19 Claims, 9 Drawing Sheets

(56) References Cited

U.S. PATENT DOCUMENTS

| | | | | |
|---|---|---|---|---|
| 2021/0116907 A1* | 4/2021 | Altman | ............... | G05D 1/0061 |
| 2023/0247392 A1* | 8/2023 | Hwang | ............... | H04W 88/06 |
| | | | | 370/329 |
| 2023/0362581 A1* | 11/2023 | Brooks | ............... | H04W 4/021 |
| 2024/0053744 A1* | 2/2024 | Jornod | ................ | H04Q 9/00 |

OTHER PUBLICATIONS

3GPP TR 36.777 V15.0.0, "3rd Generation Partnership Project; Technical Specification Group Radio Access Network; Study on Enhanced LTE Support for Aerial Vehicles (Release 15)," Dec. 2017, 89 pages, 3GPP Organizational Partners.

"UAS—UAV," Nov. 18, 2019, 3 pages, 3GPP.

"FMVSS, NHTSA," 2019, 9 pages, downloaded from https://www.nhtsa.gov/laws-regulations/fmvss on Nov. 15, 2019.

"D3.1 Initial Contingencies & Constraints," Sep. 18, 2018, 140 pages, Edition 01.00.03, CORUS consortium.

"SC-228, Minimum Performance Standards for Unmanned Aircraft Systems," 2018, 4 pages, RTCA, Inc., downloaded from https://www.rtca.org/content/sc-228 on Nov. 15, 2019.

* cited by examiner

| SED INDEX 402 | PERFORMANCE METRICS/PARAMETERS 404 ||| OPERATIONAL PARAMETERS 312 ||
|---|---|---|---|---|---|
| | LATENCY 404A | PACKET LOSS RATE 404B | THROUGHPUT 404C | MAXIMUM VELOCITY 312A | MAXIMUM ALTITUDE 312B |
| 1 | 8MS | 0.01% | 20MB/S | 10M/S | 1000M |
| 2 | 10MS | 0.1% | 10MB/S | 5M/S | 500M |
| 3 | 15MS | 0.5% | 5MB/S | 2M/S | 250M |
| 4 | 20MS | 1% | 3MB/S | 1M/S | 100M |

SED 302$_1$
SED 302$_2$
SED 302$_3$
SED 302$_4$

FIG. 4A

| SED INDEX 402 | PERFORMANCE METRICS/PARAMETERS 404 | | | ENVIRONMENT CONDITIONS 406 | | OPERATIONAL PARAMETERS 312 | |
|---|---|---|---|---|---|---|---|
| | LATENCY 404A | PACKET LOSS RATE 404B | THROUGHPUT 404C | WIND SPEED 406A | LOCATION 406B | MAXIMUM VELOCITY 312A | MAXIMUM ALTITUDE 312B |
| 1 | 8MS | 0.01% | 20MB/S | 0M/S | RURAL | 10M/S | 1000M |
| 2 | 10MS | 0.1% | 10MB/S | 2M/S | RURAL | 5M/S | 500M |
| 3 | 15MS | 0.5% | 5MB/S | 5M/S | URBAN | 2M/S | 250M |
| 4 | 20MS | 1% | 3MB/S | 10M/S | URBAN | 1M/S | 100M |

Rows correspond to SED 302$_1$, SED 302$_2$, SED 302$_3$, SED 302$_4$.

FIG. 4B

ADAPTIVE VIRTUAL DEAD MAN'S SWITCH FOR SAFE OPERATION OF AUTONOMOUS SYSTEMS

CROSS-REFERENCE TO RELATED APPLICATIONS

This application is a National stage of International Application No. PCT/IB2020/051562, filed Feb. 24, 2020, which is hereby incorporated by reference.

FIELD

Embodiments of the invention relate to the field of managing an autonomous robotic system; and more specifically, to managing operation of an autonomous robotic system based on the status of a communication channel with a remote-control center as indicated by an adaptive virtual dead man's switch.

BACKGROUND

There is increasing interest in using Autonomous Robotic Systems (ARSs), including Unmanned Aerial Vehicles (UAVs) and Automatic Guided Vehicles (AGVs), for a wide variety of applications throughout society. Examples include delivery services, aerial photography and film making, remote sensing tasks for agriculture, city planning, civil engineering, and support for public safety and rescue services. To serve these applications, ARSs are advancing at an increasing pace.

ARSs that have been developed and tested in controlled environments and closed test tracks have thereafter been deployed in live environments. For example, ARSs have been deployed in real-world/live environments over the last few years. This has included deployment of self-driving shuttles, autonomous freight hauling trucks, construction and agriculture vehicles, surveillance and delivery UAVs/drones, and warehouse inventory tracking robots. With all this progress, ARSs are entering a new phase of development where efficient operation and scaling are a primary focus in the place of building prototypes for the purpose of proving the technical feasibility of autonomous operation. With efficient operation and scaling as a primary focus of ARS deployment, the integration of global wide area connectivity and services will take center stage when evaluating connectivity options.

SUMMARY

A method is described for managing operation of an autonomous robotic system based on a status of a connection between the autonomous robotic system and a remote-control center, which manages operation of the autonomous robotic system. The method includes determining, by the autonomous robotic system, a set of connection performance metrics, which indicate current performance characteristics of the connection between the autonomous robotic system and the remote-control center during a mission; determining, by the autonomous robotic system, a first safety envelope description from a set of safety envelope descriptions for the autonomous robotic system based on the set of connection performance metrics, wherein each safety envelope description in the set of safety envelope descriptions includes a mapping of connection performance metrics to operational parameters, which define operating parameters for the autonomous robotic system, and the first safety envelope description maps the set of connection performance metrics to a first set of operational parameters; determining, by the autonomous robotic system, that the first set of operational parameters is different from a second set of operational parameters currently being used by the autonomous robotic system; and applying, by the autonomous robotic system in response to determining that the first set of operational parameters is different from the second set of operational parameters, the first set of operational parameters such that the first set of operational parameters govern operation of the autonomous robotic system during the mission.

A non-transitory computer-readable storage medium is described that stores instructions which, when executed by a set of one or more processors of an autonomous robotic system that communicates with a remote-control center over a connection, cause a computing device to: determine a set of connection performance metrics, which indicate current performance characteristics of the connection between the autonomous robotic system and the remote-control center during a mission; determine a first safety envelope description from a set of safety envelope descriptions for the autonomous robotic system based on the set of connection performance metrics, wherein each safety envelope description in the set of safety envelope descriptions includes a mapping of connection performance metrics to operational parameters, which define operating parameters for the autonomous robotic system, and the first safety envelope description maps the set of connection performance metrics to a first set of operational parameters; determine that the first set of operational parameters is different from a second set of operational parameters currently being used by the autonomous robotic system; and apply, in response to determining that the first set of operational parameters is different from the second set of operational parameters, the first set of operational parameters such that the first set of operational parameters govern operation of the autonomous robotic system during the mission.

The described embodiments describe implementation of an Adaptive Virtual Dead Man's Switch (AVDMS) that provides a practical way to optimize operation of autonomous robotic systems. In particular, operation of the AVDMS assists adherence to specific safety requirements under varying connectivity conditions.

BRIEF DESCRIPTION OF THE DRAWINGS

The invention may best be understood by referring to the following description and accompanying drawings that are used to illustrate embodiments of the invention. In the drawings:

FIG. 4A shows a set of Safety Envelope Definitions (SEDs) that map connectivity performance metrics/parameters to sets of operational parameters, according to one example embodiment.

FIG. 4B shows a set of Safety Envelope Definitions (SEDs) that map connectivity performance metrics/parameters and environment conditions to sets of operational parameters, according to one example embodiment.

DESCRIPTION OF EMBODIMENTS

Figure 1:
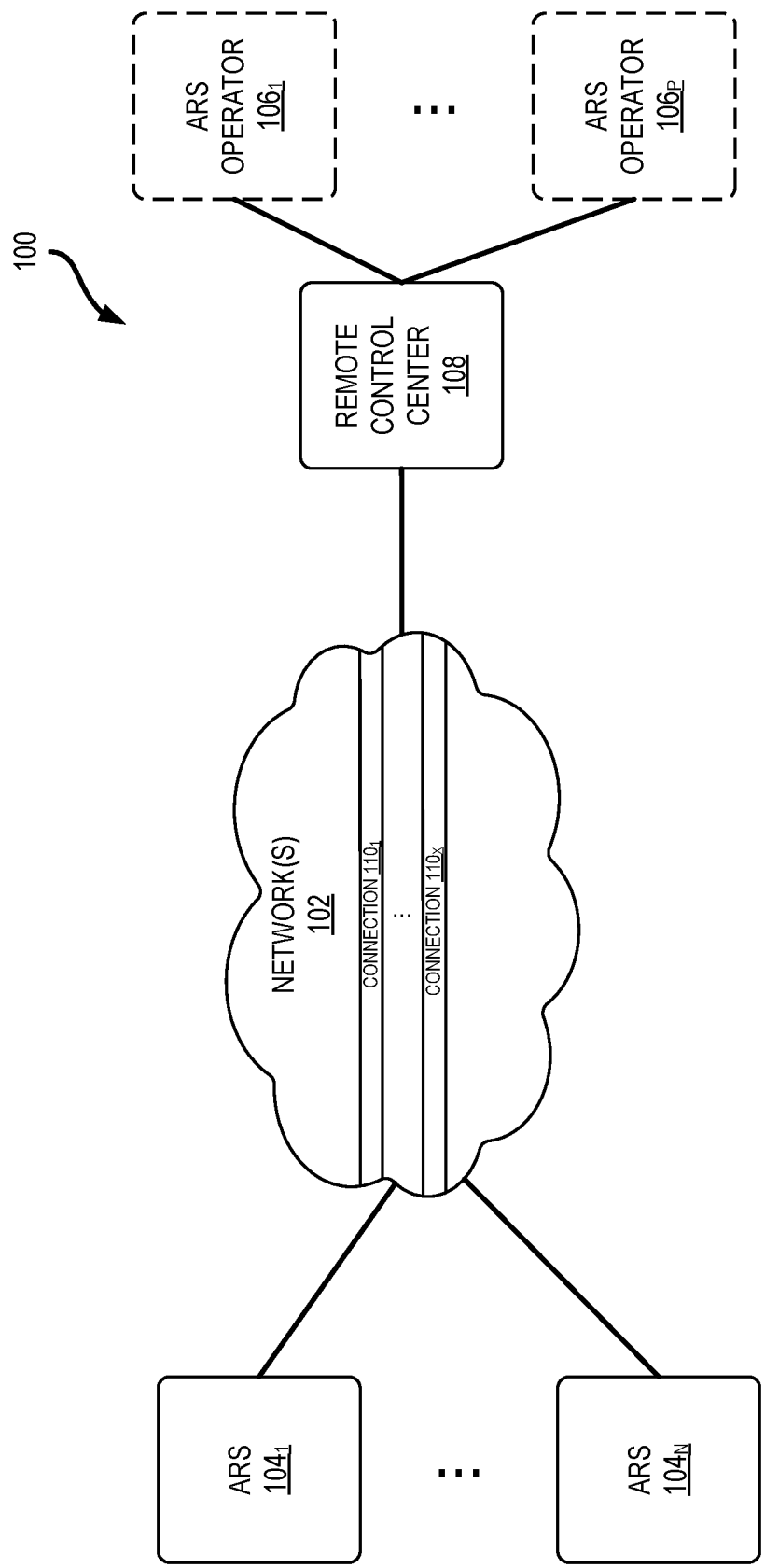
FIG. 1 illustrates an unmanned traffic system for managing operation of a set of Autonomous Robotic Systems (ARSs) with support from a Remote-Control Center (RCC), according to one example embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

FIG. 1 shows an unmanned traffic system 100 for managing operation of a set of Autonomous Robotic Systems (ARSs) 104, according to one example embodiment. As used herein, an ARS 104 may be an Unmanned Aerial Vehicle (UAV) (sometimes referred to as a drone or Unmanned Aircraft System (UAS)) and/or an Automatic Guided Vehicle (AGV) (i.e., a vehicle that operates on the ground or in the water). The unmanned traffic system 100 may be used for managing the operations, including paths and operational parameters (e.g., maximum velocity and/or maximum altitude), of ARSs 104 that are supervised and/or owned by corresponding ARS operators 106 (e.g., human operators) via a Remote-Control Center (RCC) 108. For example, as shown in FIG. 1, the ARS operators $106_1$-$106_P$ are coupled to the RCC 108 for controlling and/or monitoring one or more of the ARSs $104_1$-$104_N$. For instance, one ARS operator 106 can manage one or more ARSs 104. In some embodiments, the ARS operators 106 may utilize an electronic device (e.g., a smartphone, tablet, laptop, etc.) for connecting and communicating with the RCC 108 to manage one or more ARSs 104.

Although described in relation to a set of ARS operators 106 that manage the ARSs 104, the ARSs 104 may be autonomous such that the ARS operators 106 provide general guidance to the ARSs 104 via the RCC 108. For example, the ARS operators 106 could provide a mission or an objective for an ARS 104 to complete and the ARS 104 autonomously carries out the mission and/or accomplishes the objective without further interaction with the ARS operator 106. As will be described in greater detail below, an ARS 104 may accomplish a set of missions or tasks based on a changing set of operational parameters as dictated by a status of a communication channel 110 between the ARS 104 and the RCC 108 and/or an environment in which the ARS 104 is operating.

As shown in the FIG. 1, the ARSs $104_1$-$104_N$ are coupled to the RCC 108 via a set of networks 102. The set of networks 102 (sometimes referred to as the network 102) can be any set of networks, including a set of cellular networks. In some embodiments, the set of networks 102 can include a 3rd Generation Partnership Project (3GPP) network system. For example, the set of networks 102 may include an Evolved Universal Mobile Telecommunications System (UMTS) Terrestrial Radio Access Network (E-UTRAN), a Universal Terrestrial Radio Access Network (UTRAN), and/or a Global System for Mobile communication (GSM) Enhanced Data Rates for a GSM Evolution (EDGE) Radio Access Network (GERAN). The set of networks 102 may be administered by a network operator (e.g., a cellular network operator) and the ARSs 104 may each be a subscriber to one or more of these networks 102. The set of networks 102 may comprise various network devices. Each of the network devices may, in some embodiments, be electronic devices that can be communicatively connected to other electronic devices (e.g., other network devices, user equipment devices (such as the ARSs 104), radio base stations, etc.). In certain embodiments, the network devices may include radio access features that provide wireless radio network access to other electronic devices, such as user equipment devices (UEs) (for example a "radio access network device" may refer to such a network device). For example, the network devices may be base stations, such as an eNodeB in Long Term Evolution (LTE), a NodeB in Wideband Code Division Multiple Access (WCDMA), or other types of base stations, as well as a Radio Network Controller (RNC), a Base Station Controller (BSC), or other types of control nodes. Each of these network devices, which include radio access features to provide wireless radio network access to other electronic devices, may be referred to as cells, towers, cellular towers, or the like. As will be described in greater detail below, the set of networks 102 facilitate the transmission of messages between the ARSs $104_1$-$104_N$ and the RCC 108 via corresponding channels $110_1$-$110_X$ (sometimes referred to as connections $110_1$-$110_X$).

As noted above, the ARSs $104_1$-$104_N$ may each be any type of robotic vehicle or system, including those that are totally autonomous (e.g., an ARS 104 that performs a mission or accomplishes an objective entirely unaided by a human operator (e.g., the ARS operators $106_1$-$106_P$)) or partially autonomous (e.g., an ARS 104 that performs a mission only partially assisted by a human operator).

Figure 2:
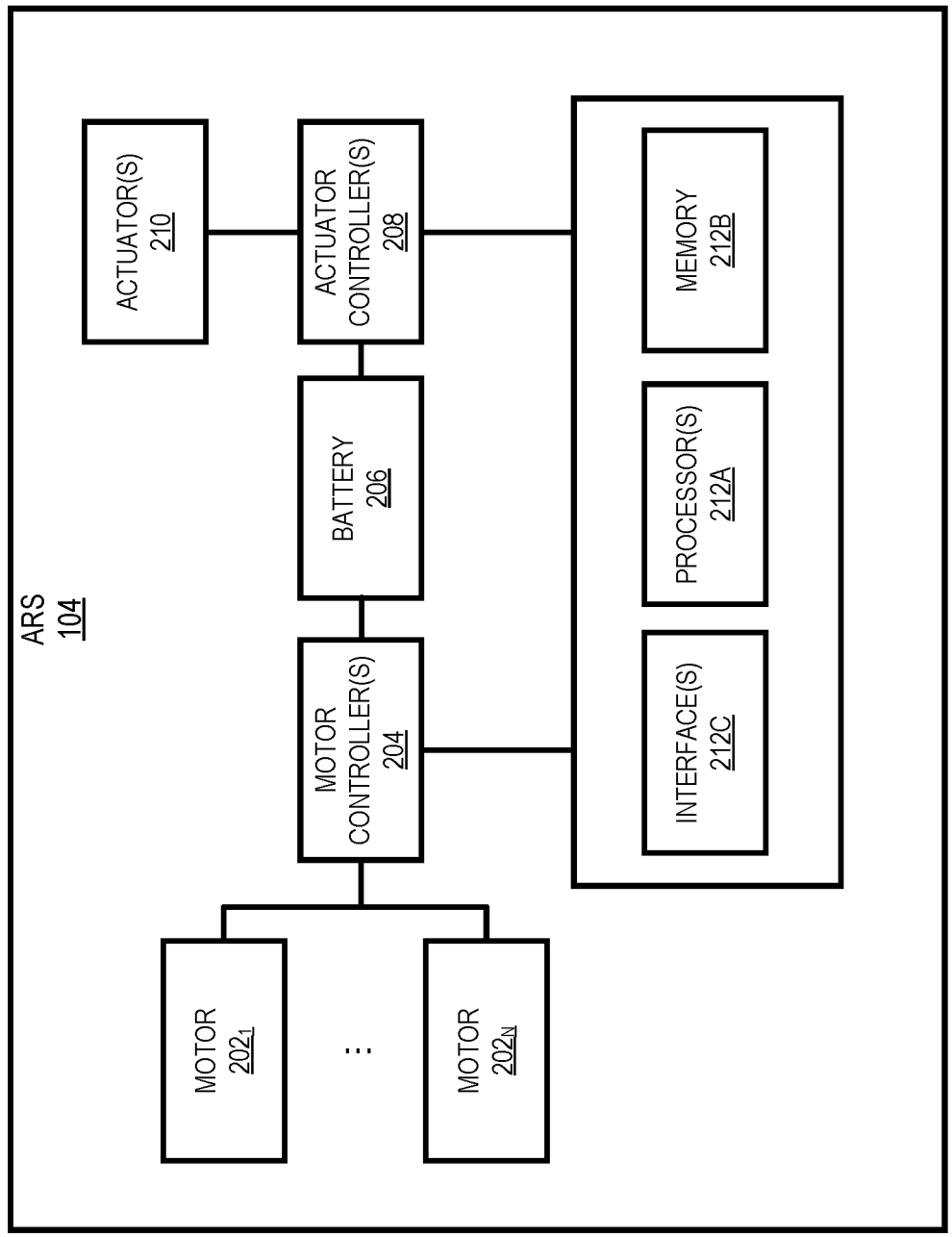
FIG. 2 illustrates a block diagram of an ARS, according to one example embodiment.

FIG. 2 shows a block diagram of an ARS 104 according to one example embodiment. Each element of the ARS 104 will be described by way of example below and it is understood that each ARS 104 may include more or fewer components than those shown and described herein.

As shown in FIG. 2, an ARS 104 may include a set of motors $202_1$-$202_N$ controlled by one or more motor controllers 204, which control the speed of rotation of the motors $202_1$-$202_N$ (e.g., rounds per minute). As used herein, the term engine may be used synonymously with the term motor and shall designate a machine that converts one form of energy into mechanical energy. For example, the motors $202_1$-$202_N$ may be electrical motors that convert electricity stored in the battery 206 into mechanical energy. The ARS 104 may include any number of motors 202 that are placed in any configuration relative to the body of the ARS 104 and/or an expected heading of the ARS 104. For example, the motors 202 may be configured such that the ARS 104 is a multirotor helicopter (e.g., a quadcopter UAV). In other embodiments, the motors 202 may be configured such that the ARS 104 is a fixed wing aircraft (e.g., a single engine or dual engine airplane). In these embodiments, the motors 202, in conjunction with other elements of the ARS 104, serve to keep the ARS 104 in flight and/or to propel the ARS 104 in a desired direction. In some embodiments, the ARS 104 may not include motors 202 for propelling the ARS 104 forward. In this embodiment, the ARS 104 may be a glider or lighter-than-air aircraft (e.g., a weather balloon). Although described in relation to aircraft, the ARS 104 shown in FIG. 2 may be a ground vehicle, water vessel, or any other type of vehicle/system. Accordingly, the use of aircraft or parts typically employed in aircraft in the description is for illustrative purposes.

As noted above, the motors 202 are controlled by one or more motor controllers 204, which govern the speed of rotation of each motor 202. In one embodiment, the motor controllers 204 may work in conjunction with actuator controllers 208 and actuators 210 that control the pitch, angle, and/or rotation of propellers, flaps, slats, slots, rotors, rotor blades/wings, axles, and other control systems. The motor controllers 204 and actuator controllers 208 may be managed/controlled by one or more processors 212A that are communicatively coupled to a memory 212B and one or more interfaces 212C.

In some embodiments, the memory 212B may store instructions that when executed by the processors 212A cause the ARS 104, via adjustments to settings/parameters of the motor controllers 204 and actuator controllers 208, to move in a particular direction (vertical or horizontal), maintain a particular flight pattern (e.g., hover at a particular altitude), and/or adhere to a set of updateable/modifiable operational parameters/constraints (e.g., maximum velocity and/or maximum altitude).

The ARS 104 may communicate with one or more other devices (e.g., the RCC 108) using the one or more interfaces 212C. In one embodiment, one of the interfaces 212C in an ARS 104 may comply with a 3GPP protocol, such as one used by the set of networks 102 such that the ARS 104 may be associated or otherwise operate in the set of networks 102. For example, an interface 212C may adhere to one or more of Global System for Mobile communication (GSM) (including General Packet Radio Service (GPRS) and Enhanced Data Rates for GSM Evolution (EDGE)), UMTS (including High Speed Packet Access (HSPA)), and Long-Term Evolution (LTE). In some embodiments, one or more interfaces 212C in the ARS 104 may allow an ARS operator 106 and/or the RCC 108 to control, monitor, or otherwise communicate with the ARS 104.

As noted above, the RCC 108 may maintain a set of connections 110 with corresponding ARSs 104. For example, each ARS 104 may establish a set of connections 110 with the RCC 108 for communicating a set of messages via the set of networks 102, which are organized in streams of data. The set of connections 110 may be established through one or more interfaces 212C and may form a wireless command and control (C2) connection that allows the RCC 108 to control and/or monitor the ARSs 104 as well as establish a connectivity and/or operational status of the ARSs 104. In some embodiments, the set of connections 110 may additionally allow the RCC 108 and the ARS operators 106 to receive data from the ARSs 104. For example, the data may include images, video streams, telemetry data, and system status (e.g., battery level/status).

ARSs 104 may need to adhere to minimum operational performance standards, metrics, and/or rules. Some of these performance metrics may be specified by industry specific standardization organizations and regulatory agencies. For example, the National Highway Traffic Safety Administration (NHTSA) sets standards and rules for automobiles or other ground devices operating within the United States while the Radio Technical Commission for Aeronautics (RTCA) provides guidance for airborne systems operating within the United States. In addition to these baseline performance metrics, an entity responsible for the operation of an ARS 104 may define additional performance metrics. These performance metrics may vary based on the actual use of the ARSs 104 (e.g., environment conditions which can indicate whether an ARS 104 is deployed in a rural or urban environment, wind speed, or other environmental conditions).

Regardless of the source of the performance metrics, a purpose of these performance metrics is to ensure that ARSs 104 operate safely in their environment (i.e., each ARS 104 is within a safety envelope for the specific mission the corresponding ARS 104 is undertaking). Under normal operation, the state of the ARS 104 should be within the constraints/parameters defined by the performance metrics (e.g., within the safety envelope defined by the performance metrics). In particular, the operational parameters (e.g., a maximum velocity and/or altitude of the ARS 104) ensure that a set of performance metrics (e.g., latency, packet loss ratio, and throughput metrics relative to a connection 110) are met. A violation of the performance metrics may put the ARS 104 in an off-nominal operation mode or state and requires immediate corrective action to return to a safe mode/state. These corrective actions, for example, may include a return of the ARS 104 to a base or an immediate halt of forward motion of the ARS 104 (e.g., maintain the ARS 104 in a holding pattern) to wait for guidance from an ARS operator 106.

In terms of network connectivity or communication status/states between the ARS 104 and the RCC 108, two states or modes can be considered: (1) a normal or nominal state in which a network connectivity or a communication status between the ARS 104 and the RCC 108 meets a set of performance metrics (e.g., a connection 110 between an ARS 104 and the RCC 108 meets a set of performance metrics) and (2) an off-nominal or loss-of-communication state in which a network connectivity or a communication status between the ARS 104 and the RCC 108 fails to meet a set of performance metrics (e.g., no reply received for the ARS 104 or the RCC 108 via a connection 110 during one or more consecutive timeout intervals). For example, these network connectivity or communication states may describe the signal quality over a connection 110 between the ARS 104 and a node in the set of networks 102. In some situations, the two network connectivity or communication states described above can be supplemented with a third state: a degraded network connectivity state. This degraded network connectivity state can be used as an early warning of a potential loss of network connectivity relative to the ARS 104 in the near future. Movement to the degraded network connectivity state may trigger preventive actions before reaching a critical loss-of-communication state. For example, upon detecting that the radio signal strength on the ARS 104 has dropped below a threshold, the ARS 104 may enter a degraded network connectivity state that indicates that the ARS 104 is approaching a maximum transmission distance of the radio communication link between the ARS 104 and the network 102, which connects the ARS 104 to the RCC 108. Entering the degraded network connectivity state may trigger corrective action to change the trajectory of the ARS 104 to potentially avoid the ARS 104 from entering an off-nominal or loss-of-communication state (e.g., to prevent further deterioration of network connectivity).

However, wireless communications are inherently more nuanced, especially technologies that support multiple concurrent users and rely on networked communication nodes (e.g., Long-Term Evolution (LTE)/5$^{th}$ Generation 3GPP networks). Due to dynamic radio network conditions (e.g., propagation loss and interference) and because of varying levels of congestion caused by changing utilization of radio channels, communication performance can change frequently. For example, under favorable conditions, latency in a network 102 may be in the order of tens of milliseconds. However, during unfavorable conditions a particular ARS 104 may experience latency in the order of hundreds of milliseconds. For safe and efficient operation, the architecture of the unmanned traffic system 100 needs to be resilient to the changes in communication quality. In essence, at least a minimum level of autonomous operation capability for the ARSs 104 needs to be preserved even when the connectivity between an ARS 104 and an RCC 108 is lost or degraded.

In some embodiments, the unmanned traffic system 100 selects the operational parameters of an ARS 104 from a set of safe operation envelope definitions to adapt operations of the ARS 104 to the dynamically changing performance of a communication channel 110 such that performance of the ARS 104 is maximized (e.g., a velocity of the ARS 104 in a route is maximized) while ensuring safe performance metrics relative to a connection 110 (e.g., latency, a packet loss ratio, and/or a throughput still meet a set of performance metrics). For instance, an Adaptive Virtual Dead Man's Switch (AVDMS) may be used for exchanging messages between the ARS 104 and the RCC 108 to (1) monitor connectivity performance of a keep-alive message stream and associated command, control, and telemetry communication channel 110 (i.e., to establish current performance metrics for the communication channel 110) and (2) coordinate operational parameter changes of the ARS 104 accordingly (e.g., adjust a maximum velocity and/or altitude of the ARS 104 while navigating a route).

One example of the adaptive virtual dead man's switch includes an autonomous UAV style ARS 104 flying in a densely populated area. In this example embodiment, safe operation of the fully autonomous ARS 104 requires telemetry updates corresponding to the ARS for the RCC 108 to track the normal operation of the ARS 104. In particular, the ARS 104 will need to receive keep-alive messages from the RCC 108 while transmitting telemetry data on the keep-alive message stream. If these keep-alive messages are not received for a predefined period, the ARS 104 will enter an off-nominal or loss-of-communication state, triggering corrective action (e.g., immediate stop/hoover/loiter of the ARS 104).

In particular, the UAV style ARS 104 in this example transmits telemetry data to the RCC 108 at a prescribed interval. The RCC 108 requires periodic telemetry data updates from the ARS 104 to check system health, including performance metrics related to a connection 110, and normal progression of the mission. In response to the telemetry data or independent of the telemetry data (e.g., at a separate rate or interval), the RCC 108 transmits keep-alive messages to the ARS 104 via a connection 110. As noted above, if these keep-alive messages are not received by the ARS 104 at a predefined rate or interval, an error state occurs. Assuming a current maximum velocity of 100 miles-per-hour (mph) (as defined by Federal Aviation Administration (FAA) regulations in the United States), the ARS 104 may travel approximately 45 meters-per-second (mps) when traveling at this maximum velocity. If the ARS operator 106 wants to limit the blackout period or distance (i.e., the time or distance traveled by the ARS 104 between transmission of the last telemetry data by the ARS 104, receipt of the telemetry data by the RCC 108, transmission by the RCC 108 of a subsequent action command to the ARS 104, and receipt of the action command by the ARS 104 (i.e., a full round trip time (RTT) latency)) to 4.5 meters physical distance travelled by the ARS 104, the keep alive messages need to be exchanged within 100 milliseconds, which requires at most a 100 ms RTT latency. To cater for delay variation and potential packet loss, a more frequent exchange of the keep-alive messages may be needed to push the required RTT lower. In this scenario, if the RTT is increased above 100 ms, the off-nominal state would be triggered, impacting the mission of the ARS 104. An alternative would be to relax the latency requirement to a higher amount (e.g., 200 ms), which increases the blackout period to nine meters of distance traveled.

To improve efficiency of operation while maintaining the safety standard of a mission of an ARS 104, embodiments described herein adapt operation parameters of the ARS 104 to the current actual latency performance of the connection 110. In particular, the ARS 104 and RCC 108 can continuously measure RTT along with other network performance metrics on the connection 110 (e.g., jitter, packet loss, throughput, etc.) and, based on a predefined safe distance (e.g., 4.5 meters) corresponding to a blackout period, can adjust the operational parameters of the ARS 104. In this example, it would reduce or increase the maximum allowable velocity of the ARS 104 according to the network performance metrics. For example, when the RTT on a connection 110 between the ARS 104 and the RCC 108 is 200 ms, the ARS 104 and/or the RCC 108 will lower the maximum allowable velocity of the ARS 104 to 50 mph as updates are not being received in a frequent enough manner to warrant a higher maximum velocity. When the network conditions improve, the maximum allowable velocity of the ARS 104 can increase while still maintaining a low RTT and consequent high frequency of data updates. This adaptive operation optimizes the execution of the mission without compromising safety.

Another example involves the remote teleoperation of an ARS 104. An ARS operator 106, may provide assistance to help ARSs 104 get out of difficult situations. Safe teleoperation requires real-time exchange of sensor data (e.g., telemetry data and video camera data) and control commands (e.g., joystick movements) between the ARS 104 and the ARS operator 106. The higher the resolution of data from the ARS 104 the better the ARS operator 106 can assess the situation and sense the movements of the ARS 104. On the control side, the lower the roundtrip latency (i.e., RTT) between the ARS 104 and the ARS operator 106 over a C2 connection 110, the better control experience for the ARS operator 106. Similar to the previous example, an operational envelope with corresponding operational parameters can be adjusted to ensure the most optimal and safe remote operation under varying communication performance conditions. In this case, the operational envelope and parameters may specify at what velocities ARS movements are executed to ensure a particular video frame rate and RTT latency. If the latency is high, the ARS 104 may move slower to reduce the blackout period of the ARS operator 106, while under favorable connectivity conditions the operation may be more real-time with faster robot movements.

In one embodiment, an adaptive virtual dead man's (AVDMS) switch is composed of processes running on the ARS 104 and the RCC 108 and a communication protocol that operates between the ARS 104 and the RCC 108. For example, there can be two adaptive virtual dead man's switch deployment modes: (1) a direct mode in which the ARS 104 is directly communicating with the RCC 108 and (2) a cascaded mode in which one or more Intermediate Control Entities (ICEs) bridge an AVDMS session/stream and act as asynchronous relays between an ARS 104 and the RCC 108 (e.g., the communication frequency between an ARS 104 and an ICE is higher than a communication frequency between the ICE and the RCC 108).

Figure 3:
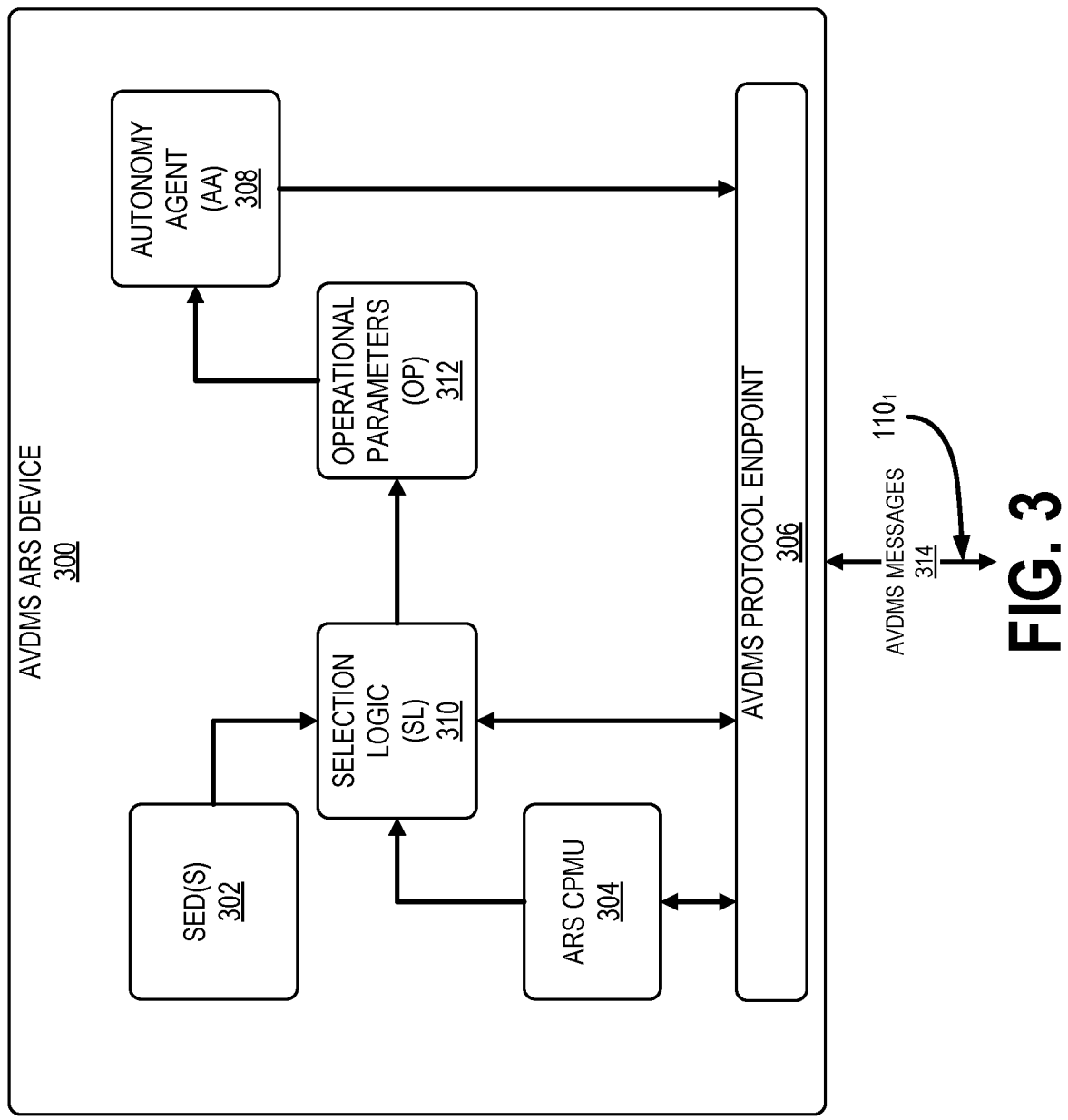
FIG. 3 illustrates a component diagram of an Adaptive Virtual Dead Man's Switch (AVDMS) ARS device, according to one example embodiment.

FIG. 3 shows a component diagram of an AVDMS ARS device 300 according to one example embodiment. The AVDMS ARS device 300 may operate in one or more of the ARSs $104_1$-$104_N$. For example, an AVDMS ARS device 300 may reside in the memory 212B of an ARS 104 and may be processed by a processor 212A of the ARS 104 for implementing an AVDMS stream on an AVDMS communication channel. As used below, the AVDMS communication channel may be one of the channels 110 and may facilitate an AVDMS stream, which is a stream of AVDMS messages in both the uplink (i.e., from the ARS 104 towards the RCC 108) and downlink (i.e., from the RCC 108 towards the ARS 104) directions. For purposes of illustration, the AVDMS communication channel will be referred to as the AVDMS communication channel $110_1$ in the description below.

As shown in FIG. 3, an AVDMS ARS device 300 may include a set of Safety Envelope Definitions (SEDs) 302 that describe operational parameters 312 of the ARS 104 (e.g., velocity and altitude) mapped to connectivity performance metrics/parameters (e.g., latency, jitter, packet loss, and throughput). For example, FIG. 4A shows a set of SEDs $302_1$-$302_4$ that map connectivity performance metrics/parameters 404 to sets of operational parameters 312. In particular, as shown in FIG. 4A, the set of SEDs $302_1$-$302_4$ include an SED index 402, connectivity performance metrics/parameters 404 (e.g., latency 404A, packet loss rate 404B, and throughput 404C) and operational parameters 312 (e.g., maximum velocity 312A and maximum altitude 312B). Accordingly, based on a set of performance metrics/parameters 404, a set of operational parameters 312 can be selected. In some embodiments, the set of SEDs $302_1$-$302_4$ may additionally include a set of local conditions. For example, as shown in FIG. 4B, the set of SEDs $302_1$-$302_4$ may include a set of local/environmental conditions 406 (e.g., wind speed 406A and location 406B), which may be used along with the set of performance metrics/parameters 404 for identifying a set of operational parameters 312.

In some embodiments, a set of performance metrics/parameters 404 may span multiple SEDs 302. For example, a determined/measured packet loss rate 404B may fit SED $302_2$ (i.e., the determined/measured packet loss rate 404B is 0.1% or is within a predefined deviation from 0.1%) but the determined/measured throughput 404C fits SED $302_3$ (i.e., the determined/measured throughput 404C is 5 MB/S or is within a predefined deviation from 5 MB/S). Alternatively, or in addition to the above example, the determined/measured performance metrics/parameters 404 may fit SED $302_1$ but environment conditions 406 fit SED $302_2$. In such a case, the AVDMS ARS device 300 may select an SED 302 and corresponding set of operational parameters 312 based on or more factors. For instance, the AVDMS ARS device 300 may take a conservative approach and select an SED 302 with the most conservative set of operational parameters 312 (e.g., lowest maximum velocity 312A and lowest maximum altitude 312B). Alternatively, the AVDMS ARS device 300 may average the set of operational parameters 312 of multiple potential SEDs 302 to arrive at a selected set of operational parameters 312.

As also shown in FIG. 3, an AVDMS ARS device 300 may include an ARS communication performance measurement unit (CPMU) 304 that continuously monitors various communication characteristics/metrics, including one or more of latency, jitter, throughput, and packet loss characteristics experienced by AVDMS messages 314 on the AVDMS communication channel $110_1$. The AVDMS communication channel $110_1$ may be a communication channel that operates at a low bandwidth and at a high frequency to keep the RCC 108 updated on the status of the ARS 104, as well as to supervise operation of the ARS 104 by an off-board system (e.g., the RCC 108 and/or an ARS operator 106). Although the ARS CPMU 304 is only monitoring the performance of this particular communication channel $110_1$, the ARS 104 may be concurrently using other communication channels 110 and corresponding streams for payload data (e.g., sensors data, including video data). The communication performance of other communication channels 110 (e.g., non-AVDMS communication channels) may be considered irrelevant for AVDMS communication channel $110_1$ measurement and operation. In one embodiment, the ARS CPMU 304 is used for generating the performance metrics/parameters 404, which may be used for selecting operational parameters 312 based on corresponding SEDs 302.

As shown in FIG. 3, an AVDMS ARS device 300 may include an AVDMS protocol endpoint 306, which processes AVDMS messages 314 between the ARS 104 and the RCC 108. For instance, the AVDMS protocol endpoint 306 receives telemetry and mission status information from the autonomy agent (AA) 308 to be relayed to the RCC 108 on the AVDMS communication channel $110_1$. For example, the AA 308 may generate telemetry and status information and transfer this information to the AVDMS protocol endpoint 306 for transmission to the RCC 108. In this configuration, the AVDMS protocol endpoint 306 checks the healthy operation of the AA 308 such that critical telemetry and status information provided by the AA 308 can be consistently provided to the RCC 108 in AVDMS messages 314. This critical information can be signaled implicitly or explicitly to the RCC 108. With implicit signaling, AVDMS messages 314, which include telemetry and status information, are transmitted to the RCC 108 at a prescribed interval/frequency. However, no AVDMS messages 314 are sent to the RCC 108 unless the AA 308 delivers updated telemetry and status information to the AVDMS protocol endpoint 306 (i.e., AVDMS messages 314 are not transmitted at the prescribed interval/frequency). This ensures that no AVDMS messages 314 are sent in the case the ARS 104 is operating headless (e.g., the AA 308 process has crashed or is otherwise not operating properly). In this scenario, other subsystems and processes of the ARS 104 may still be functioning properly (e.g., sensor data is still available) but the ARS 104 is in a safety critical state and the RCC 108 should be notified of this status by the failure of receipt of AVDMS messages 314 at the prescribed interval/frequency. Given AVDMS messages 314 will not be sent, the RCC 108 will declare a critical failure and initiate an appropriate action. Alternatively, with explicit signaling, the AVDMS protocol endpoint 306 may still send AVDMS messages 314 in which the endpoint 306 explicitly notifies the RCC 108 of an unresponsive AA 308.

As shown in FIG. 3, an AVDMS ARS device 300 may include selection logic (SL) 310 that operates based on the information received from the ARS CPMU 304 (e.g., performance metrics/parameters 404) and/or the AVDMS protocol endpoint 306. In particular, the SL 310 may determine the performance metrics/parameters 404 of the AVDMS communication channel 110 from the CPMU 304 and determines a highest-ranked matching SED 302 with corresponding operational parameters 312. In particular, the SEDs $302_1$-$302_4$ of FIGS. 4A and 4B may be arranged in order by rank such that the SED $302_1$ is the highest-ranked SED 302 and the SED $302_4$ is the lowest-ranked SED 302. In this example, the SL 310 compares the performance metrics/parameters 404 with the SED $302_1$ to potentially determine a match. Upon failure to determine a match in relation to the SED $302_1$, the SL 310 performs a comparison in relation to the performance metrics/parameters 404 of the next highest-ranked SED 302 (e.g., the SED $302_2$). Upon finding a first match between the performance metrics/parameters 404 with an SED 302, the corresponding operational parameters 312 are selected. The determined/selected operational parameters 312 are used to configure the AA 308 under the current conditions. The ordering of SEDs 302 is at the discretion of the operator of the unmanned traffic system 100 and is provided as a priority ranking attached to each SED 302. Although the SL 310 will attempt to locate the highest priority matching SED 302, if no SED 302 matches the current connectivity performance metrics, the SL 310 will declare a critical loss-of-communication condition and the AA 308 will trigger associated actions on the ARS 104 (e.g., default operational parameters 312 may be selected). Such a situation may occur if the communication is lost between the ARS 104 and RCC 108 on the AVDMS communication channel 110 for longer than a predefined period.

Figure 5:
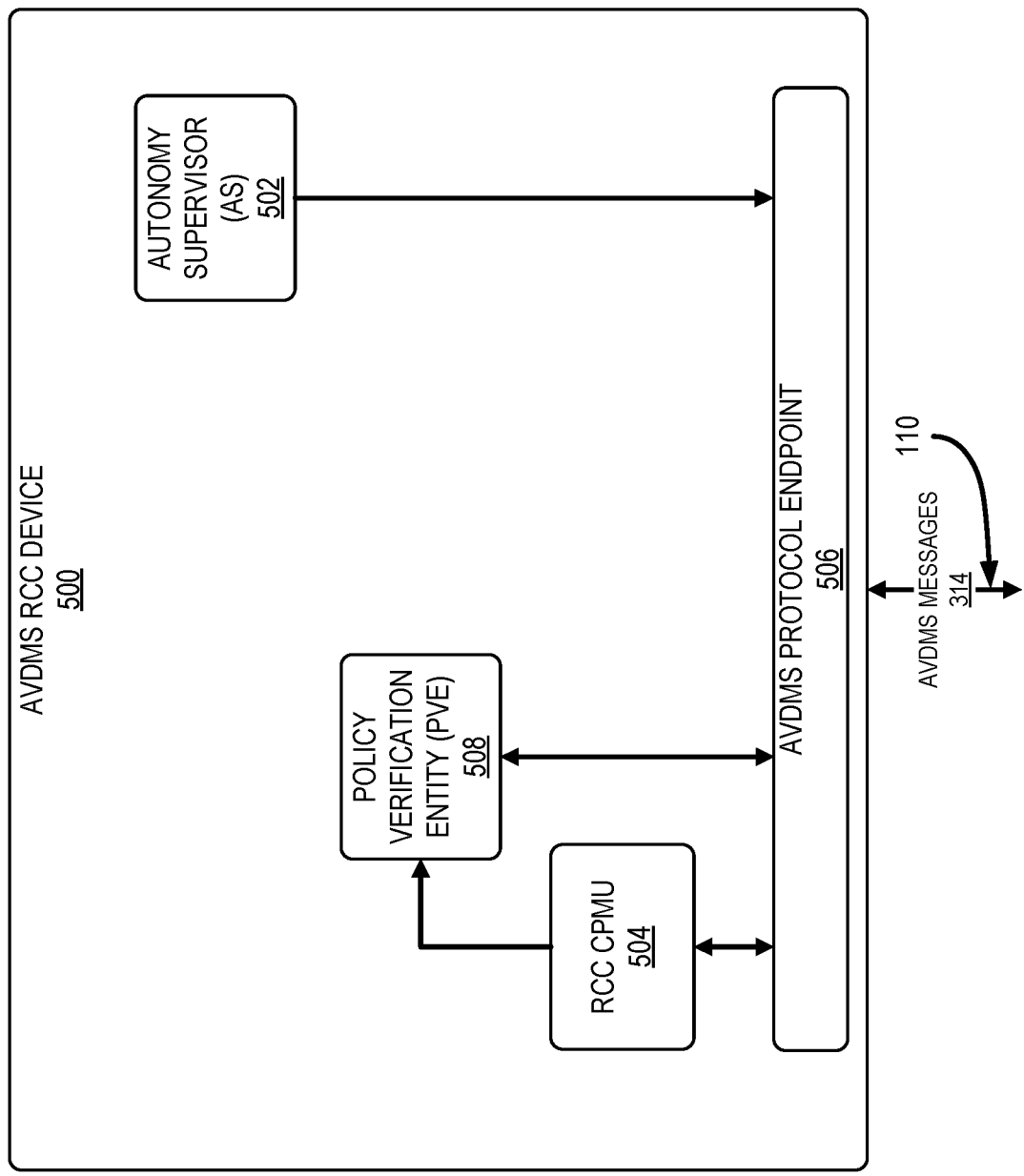
FIG. 5 illustrates a component diagram of an AVDMS RCC device, according to one example embodiment.

Turning to the RCC 108, FIG. 5 shows a component diagram of an AVDMS RCC device 500 according to one example embodiment. The AVDMS RCC device 500 may operate in the RCC 108.

As shown in FIG. 5, the AVDMS RCC device 500 may include an AVDMS protocol endpoint 506 that processes AVDMS protocol messages 314 from ARSs 104 and relays corresponding telemetry and mission status information to an autonomy supervisor (AS) 502, which validates that the ARS 104 is operating correctly (e.g., per a mission plan and/or per operational parameters 312). If a problem is detected by the AS 502, a corrective action can be triggered. For example, an explicit mission abort command can be sent immediately to the ARS 104 in a subsequent AVDMS message 114.

As also shown in FIG. 5, the AVDMS RCC device 500 may include a communication performance measurement unit (CPMU) 504. The CPMU 504 continuously monitors various communication characteristics, including one or more of latency, jitter, throughput, and packet loss characteristics experienced by AVDMS protocol messages 314 on the AVDMS communication channel 110.

As also shown in FIG. 5, the AVDMS RCC device 500 may include a policy verification entity (PVE) 508. The PVE 508 checks the local performance metrics/parameters (e.g., performance metrics/parameters 404 generated by the RCC CPMU 504) and the remote measurements (e.g., the performance metrics/parameters 404 generated by the ARS CPMU 304) along with the SED 302 and with corresponding operational parameters 312 selected at the AS 502 to verify that the right operational parameters 312 have been selected matching the communication conditions on the AVDMS communication channel 110. If an improper set of operational parameters 312 has been selected by the AA 308 of the AVDMS ARS device 300, the AS 502 may select a new set of operational parameters 312 for use by the AA 308 and corresponding ARS 104.

As described above, the ARSs 104 and the RCC 108 may exchange AVDMS messages 314 over the AVDMS communication channel 110. In some embodiments, the AVDMS messages 314 may include one or more of (1) an ARS identifier, which identifies either a transmitting ARS 104 or a destination ARS 104; (2) an RCC identifier, which identifies either a transmitting RCC 108 or a destination RCC 108; (3) a sequence number of the AVDMS messages 314; (4) CPMU measurement data (e.g., performance metrics/parameters 404), which may include radio signal quality, radio signal strength, latency, jitter, throughput, and/or packet loss characteristics experienced by AVDMS protocol messages 314 on the AVDMS communication channel 110; (5) ARS telemetry data, including one or more of a speed, heading, altitude and/or GPS coordinates of the ARS 104 as well as battery level and system status of the ARS 104; (6) ARS mission status information, which may include an indication of "OK" (i.e., the ARS 104 has followed the planned mission and operational parameters 312), "LOCAL REPLAN" (i.e., changed planned operation to adapt to local conditions, such as rerouting to avoid a collision or use of a new set of operational parameters 312), "PAUSED" (i.e., waiting for intervention by the RCC 108), "ABORTED" (i.e., the ARS 104 encountered a critical/unrecoverable condition), or "CRITICAL" (i.e., the mission of the ARS 104 is aborted and a critical/unrecoverable condition will imminently result in the ARS 104 going offline); (7) ARS selected SED 302, which indicates an SED index 402 corresponding to a selected SED 302 with corresponding operational parameters 312; and (8) RCC commands, including "OK" (i.e., the ARS 104 is to continue autonomous operation), "PAUSE" (i.e., a safe halt of the ARS 104 and wait for ARS (i.e., human) operator 106), "ABORT" (i.e., the ARS 104 is to abort the current mission and execute an associated off-nominal procedure), and "OVERRIDE", which also indicates an SED index 402 (i.e., the ARS 104 is to use SED 302 specified by the RCC 108).

Figure 6:
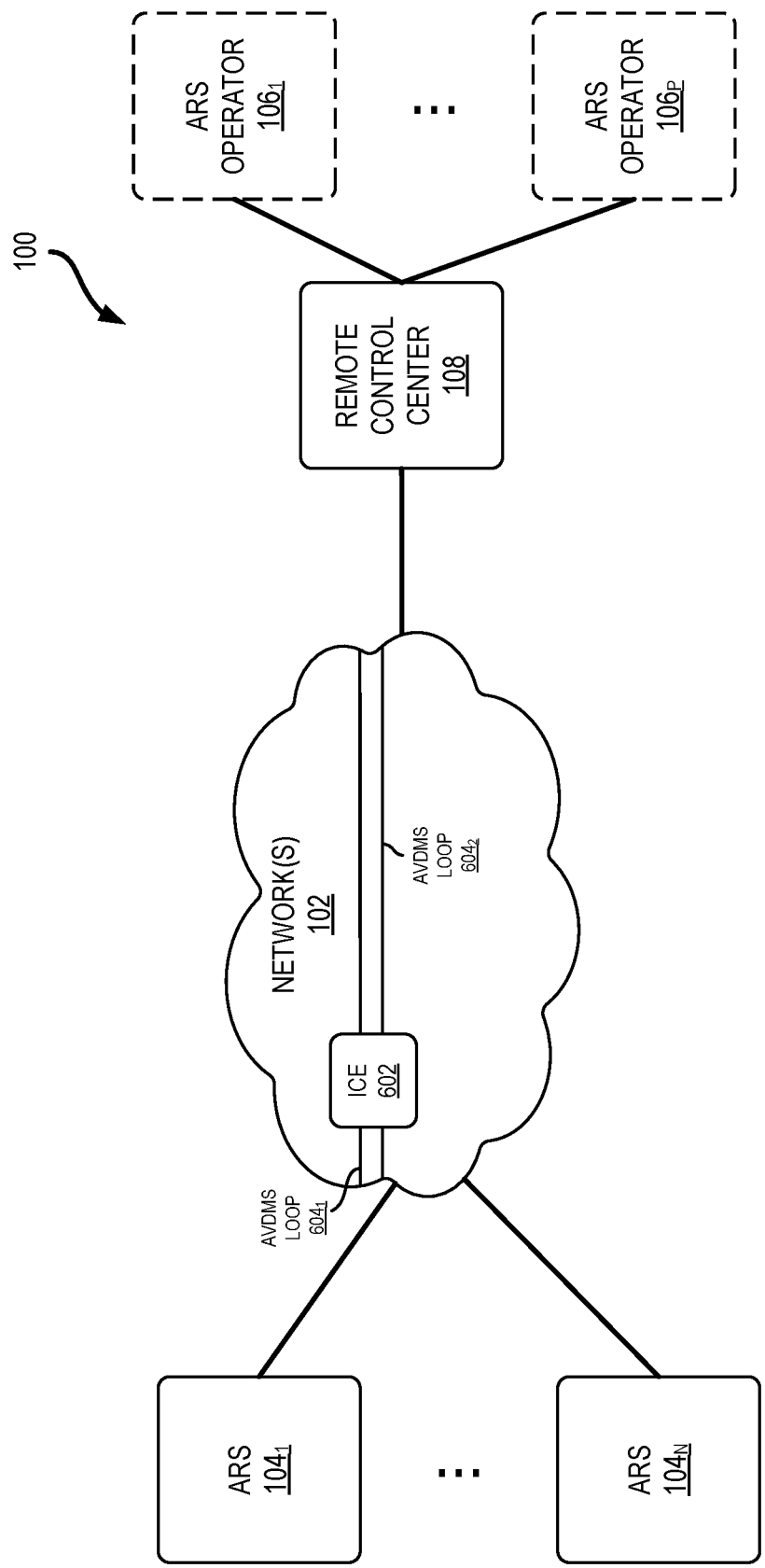
FIG. 6 illustrates an unmanned traffic system for managing operation of a set of Autonomous Robotic Systems (ARSs) with support from a Remote-Control Center (RCC) and an Intermediate Control Entity (ICE), according to one example embodiment.

An objective of the AVDMS keep-alive message stream is to ensure the ARS 104 is always supervised by a remote off-board agent that can swiftly halt autonomous operation and log and trigger alternative actions. This supervisory function can be delegated to another entity called an Intermediate Control Entity (ICE). An ICE is a device that can be placed closer to the ARS 104 than the RCC 108 (e.g., at the edge of the set of networks 102 that is proximate to the ARS 104). In particular, the communication quality between the ARS 104 and the RCC 108 with a direct communication deployment may be sub-optimal (e.g., because of the distance separating the ARS 104 and RCC 108 and the different network domains crossed, latency and jitter may be high in the AVDMS communication channel $110_1$). To alleviate this issue, an ICE may be placed on an edge node of the network 102 and in the proximity of an operational area of the ARS 104. For example, FIG. 6 shows an ICE 602 at the edge of the set of networks 102, according to one embodiment. As shown, the AVDMS communication channel $110_1$, which connects the ARSs 104 with the RCC 108, flows through the ICE 602. In this configuration, the RCC 108 can be located based on the business needs of the fleet operator (e.g., in the city where the operating company is headquartered) without regard to the location of a deployed ARS 104.

In the cascaded deployment case shown in FIG. 6, the ARS 104 communicates with an ICE 602, while the ICE 602 has a decoupled communication loop with the RCC 108 or another ICE 602 in case more than one ICE 602 is cascaded in the set of networks 102. Since the ICE 602 is responsible for the delay sensitive high frequency AVDMS messages 314 with the ARS 104, this AVDMS loop $604_1$, which can represent the AVDMS communication channel $110_1$, will determine the communication quality in relation to the ARS 104, which in turn guides the SED 302 and corresponding operational parameters 312 invoked on the ARS 104. For example, if the ICE 602 is deployed on the edge at a serving base station of an LTE/5G network, the AVDMS loop $604_1$ may be as quick as 10 ms, essentially not posing any practical communication related limitation on operation of the ARS 104. At the same time the communication between ICE 602 and RCC 108 via AVDMS loop $604_2$, can be more relaxed, as this loop $604_2$ will primarily be used to keep the RCC 108 updated while the AVDMS loop $604_1$ will be involved in higher frequency communications. Therefore, AVDMS loop $604_2$ may have a latency in the order of hundreds of milliseconds without impacting operational performance of the ARS 104.

Figure 7:
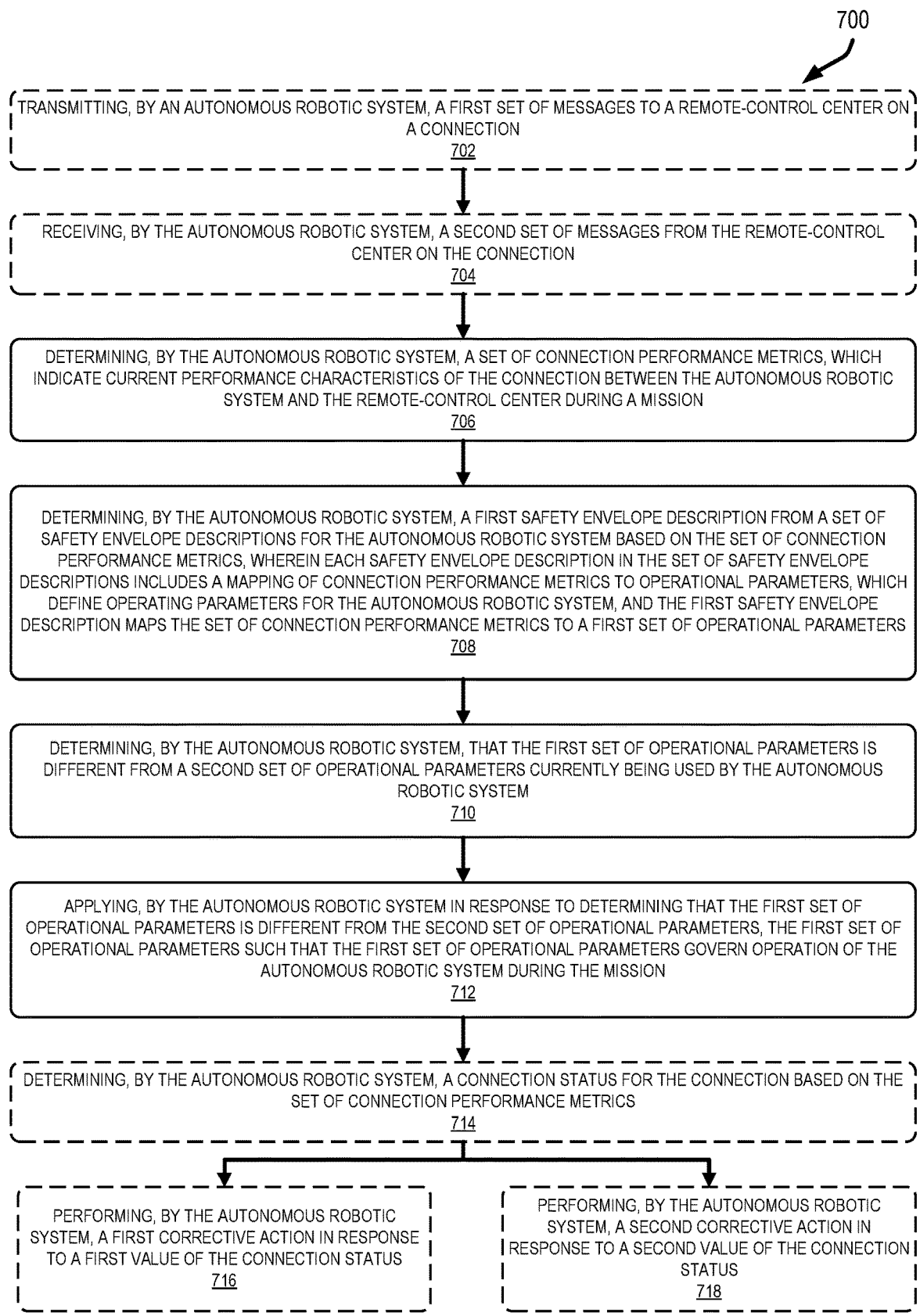
FIG. 7 illustrates a method for managing operation of an autonomous robotic system based on a status of a connection between the autonomous robotic system and a remote-control center, which manages operation of the autonomous robotic system, according to one embodiment.

Turning now to FIG. 7, a method 700, according to one example embodiment, will be described for managing operation of an autonomous robotic system 104 based on a status of a connection 110 between the autonomous robotic system 104 and a remote-control center 108, which manages operation of the autonomous robotic system 104. The method 700 will be described in relation to one or more other supporting figures. However, the use of these supporting figures, including the elements presented therein, are for purposes of illustration and the method 700 may be performed in relation to other systems and components. Further, in some embodiments, the operations of the method 700 can be performed in a different order. For example, two or more operations can be performed in at least a partially overlapping time period.

As shown in FIG. 7, the method 700 may commence at operation 702 with the autonomous robotic system 104 transmitting a first set of messages 314 to the remote-control center 108 on a connection 110.

At operation 704, the autonomous robotic system 104 receives a second set of messages 314 from the remote-control center 108 on a connection 110.

At operation 706, the autonomous robotic system 104 determines a set of connection performance metrics 404, which indicate current performance characteristics of the connection 110 between the autonomous robotic system 104 and the remote-control center 108 during a mission. In one embodiment, the set of connection performance metrics 404 indicate one or more of jitter, latency, throughput, and packet loss on the connection 110. In one embodiment, the determining the set of connection performance metrics 404 is based on one or more of (1) transmission of the first set of messages 314 and (2) receipt of the second set of messages 314. In one embodiment, a message 314 in the first set of messages 314 includes a set of fields, wherein the set of fields includes one or more of (1) an autonomous robotic system identifier, which identifies the autonomous robotic system 104; (2) a remote-control center identifier, which identifies the remote-control center 108; (3) a sequence number of the message 314; (4) connection performance metrics 404 of the connection 110; (5) telemetry data, including one or more of a speed, heading, altitude, coordinates, battery level, and system status of the autonomous robotic system 104; (6) mission status information indicating a status of the mission; and (7) a safety envelope description identifier, which identifies the current safety envelope description 302 used by the autonomous robotic system 104. In one embodiment, a message 314 in the second set of messages 314 includes a set of fields, wherein the set of fields includes one or more of (1) an autonomous robotic system identifier, which identifies the autonomous robotic system 104; (2) a remote-control center identifier, which identifies the remote-control center 108; (3) a sequence number of the message 314; (4) connection performance metrics 404 of the connection 110, which indicate performance metrics 404 for the connection 110 based on a previous set of messages 314; and (5) remote-control center commands, including one or more of a confirmation command to confirm that the autonomous robotic system 104 is to continue utilizing a current selected safety envelope description 302 and corresponding operational parameters 312, a pause command to cause the autonomous robotic system 104 to pause performance of the mission, an abort command to cause the autonomous robotic system 104 to abort the mission, and an override command to cause the autonomous robotic system 104 to use a new safety envelope description 302 and corresponding operational parameters 312. Accordingly, messages 314 (e.g., messages 314 from the remote-control center 108) can include performance metrics 404 for a previous time period, and characteristics of the messages 314 can be used to determine performance metrics 404 for a current time period.

In one embodiment, the connection 110 includes a first loop $604_1$, which connects the autonomous robotic system 104 to an intermediate control entity 602, and a second loop $604_2$, which connects the intermediate control entity 602 to the remote-control center 108. In this embodiment, the set of connection performance metrics 404 describe the first loop $604_1$. In some embodiments, the autonomous robotic system 104 and the intermediate control entity 602 exchange messages 314 on the first loop $604_1$ at a first frequency and the intermediate control entity 602 and the remote-control center 108 exchange messages 314 on the second loop $604_2$ at a second frequency. In some embodiments, the first frequency is greater than the second frequency.

At operation 708, the autonomous robotic system 104 determines a first safety envelope description $302_1$ from a set of safety envelope descriptions $302_1$-$302_4$ for the autonomous robotic system 104 based on the set of connection performance metrics 404. In some embodiments, each safety envelope description 302 in the set of safety envelope descriptions $302_1$-$302_4$ includes a mapping of connection performance metrics 404 to operational parameters 312, which define operating parameters for the autonomous robotic system 104, and the first safety envelope description $302_1$ maps the set of connection performance metrics 404 to a first set of operational parameters 312. In one embodiment, the set of safety envelope descriptions $302_1$-$302_4$ are ranked from highest to lowest such that determining the first safety envelope description 302 includes comparing the set of connection performance metrics 404 with the highest-ranked safety envelope description 302 (i.e., $302_1$ in FIGS. 4A and 4B) in the set of safety envelope descriptions $302_1$-$302_4$ to determine a potential match before comparing the set of connection performance metrics 404 with lower-ranked safety envelope descriptions 302 (i.e., $302_2$-$302_4$) in the set of safety envelope descriptions $302_1$-$302_4$ when a match with the highest-ranked safety envelope description 302 is not achieved.

At operation 710, the autonomous robotic system 104 determines that the first set of operational parameters 312 are different from a second set of operational parameters 312 currently being used by the autonomous robotic system 104. In one embodiment, the first set of operational parameters 312 include one or more of a maximum velocity 312A at which the autonomous robotic system 104 is permitted to operate and a maximum altitude 312B at which the autonomous robotic system 104 is permitted to operate.

At operation 712, the autonomous robotic system 104 applies, in response to determining that the first set of operational parameters 312 is different from the second set of operational parameters 312, the first set of operational parameters 312 such that the first set of operational parameters 312 govern operation of the autonomous robotic system 104 during the mission.

At operation 714, the autonomous robotic system 104 determines a connection status for the connection 110 based on the set of connection performance metrics 404.

At operation 716, the autonomous robotic system 104 performs a first corrective action in response to a first value of the connection status. In one embodiment, the first value of the connection status indicates that the connection 110 is inoperable and the first corrective action is one of (1) the autonomous robotic system 104 to return to a designated location and (2) the autonomous robotic system 104 to halt and wait for further instructions.

At operation 718, the autonomous robotic system 104 performs a second corrective action in response to a second value of the connection status. In one embodiment, the second value of the connection status indicates the connection 110 is operating properly but may soon become inoperable (e.g., the connection performance metrics 404 are nearing inoperable thresholds). In this situation, the second corrective action includes selecting a more conservative SED 302 (e.g., an SED 302 with lower operational parameters 312 (e.g., a lower maximum velocity 312A and/or a lower maximum altitude 312B)). Alternatively, the second value of the connection status indicates the connection 110 is operating properly and well within connection performance metrics 404 corresponding to the currently selected SED 302. In this situation, the second corrective action includes taking no further action apart from continuing the current mission.

Figure 8:
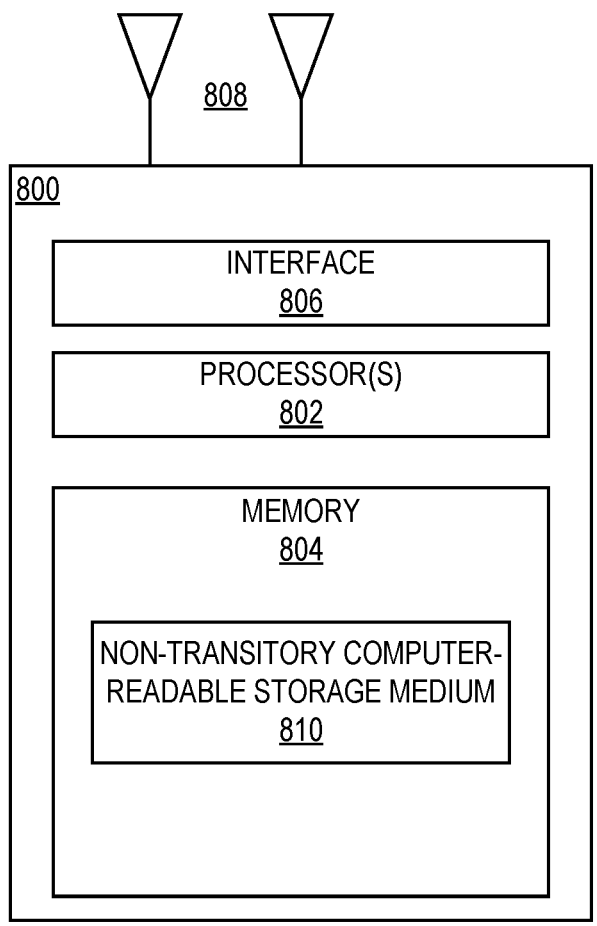
FIG. 8 illustrates a computing/networking device, according to one example embodiment.

Each element of the unmanned traffic system 100 may be composed of or otherwise implemented by a set of computing/networking devices. For example, FIG. 8, illustrates a computing/networking device 800 according to one embodiment. As shown the computing/networking device 800 may include a processor 802 communicatively coupled to a memory 804 and an interface 806. The processor 802 may be a microprocessor, controller, microcontroller, central processing unit, digital signal processor, application specific integrated circuit, field programmable gate array, any other type of electronic circuitry, or any combination of one or more of the preceding. The processor 802 may comprise one or more processor cores. In particular embodiments, some or all of the functionality described herein as being provided by a component of the unmanned traffic system 100 may be implemented by one or more processors 802 of one or more computing/networking devices 800 executing software instructions, either alone or in conjunction with other computing/networking devices 800 components, such as the memory 804.

The memory 804 may store code (which is composed of software instructions and which is sometimes referred to as computer program code or a computer program) and/or data using non-transitory machine-readable (e.g., computer-readable) media, such as a non-transitory computer-readable storage medium (e.g., magnetic disks, optical disks, solid state drives, read only memory (ROM), flash memory devices, phase change memory) and machine-readable transmission media (e.g., electrical, optical, radio, acoustical or other form of propagated signals—such as carrier waves, infrared signals). For instance, the memory 804 may comprise non-volatile memory (e.g., a non-transitory computer-readable storage medium 810) containing code to be executed by the processor 802. Where the memory 804 is non-volatile, the code and/or data stored therein can persist even when the computing/networking device 800 is turned off (when power is removed). In some instances, while the computing/networking device 800 is turned on, that part of the code that is to be executed by the processor(s) 802 may be copied from non-volatile memory into volatile memory (e.g., dynamic random-access memory (DRAM), static random-access memory (SRAM)) of the computing/networking device 800.

The interface 806 may be used in the wired and/or wireless communication of signaling and/or data to or from computing/networking device 800. For example, interface 806 may perform any formatting, coding, or translating to allow computing/networking device 800 to send and receive data whether over a wired and/or a wireless connection. In some embodiments, the interface 806 may comprise radio circuitry capable of receiving data from other devices in the network over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via the antennas 808 to the appropriate recipient(s). In some embodiments, interface 806 may comprise network interface controller(s) (NICs), also known as a network interface card, network adapter, local area network (LAN) adapter or physical network interface. The NIC(s) may facilitate in connecting the computing/networking device 800 to other devices allowing them to communicate via wire through plugging in a cable to a physical port connected to a NIC. In particular embodiments, the processor 802 may represent part of the interface 806, and some or all of the functionality described as being provided by the interface 806 may be provided in part or in whole by the processor 802.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing operation of an autonomous robotic system based on a status of a connection between the autonomous robotic system and a remote-control center, which manages operation of the autonomous robotic system, the method comprising:
   determining, by the autonomous robotic system, a set of connection performance metrics, which indicate current performance characteristics of the connection between the autonomous robotic system and the remote-control center during a mission;
   determining, by the autonomous robotic system, a first safety envelope description from a set of safety envelope descriptions for the autonomous robotic system based on the set of connection performance metrics, wherein the set of safety envelope descriptions are ranked from highest to lowest and wherein each safety envelope description in the set of safety envelope descriptions includes a mapping of connection performance metrics to operational parameters that define operating parameters for the autonomous robotic system, and the first safety envelope description maps the set of connection performance metrics to a first set of operational parameters, in which the first safety envelope description is determined by comparing the set of connection performance metrics with a highest-ranked safety envelope description in the set of safety envelope descriptions to determine a potential match before comparing the set of connection performance metrics with lower-ranked safety envelope descriptions in the set of safety envelope descriptions when a match with the highest-ranked safety envelope description is not achieved;
   determining, by the autonomous robotic system, that the first set of operational parameters is different from a second set of operational parameters currently being used by the autonomous robotic system; and
   applying, by the autonomous robotic system when the first set of operational parameters is different from the second set of operational parameters, the first set of operational parameters such that the first set of operational parameters govern operation of the autonomous robotic system during the mission.

2. The method of claim 1, further comprising:
   transmitting, by the autonomous robotic system, a first set of messages to the remote-control center on the connection; and
   receiving, by the autonomous robotic system, a second set of messages from the remote-control center on the connection,
   wherein the determining the set of connection performance metrics is based on one or more of (1) transmission of the first set of messages and (2) receipt of the second set of messages.

3. The method of claim 2, wherein a message in the first set of messages includes a set of fields, wherein the set of fields includes one or more of (1) an autonomous robotic system identifier, which identifies the autonomous robotic system; (2) a remote-control center identifier, which identifies the remote-control center; (3) a sequence number of the message; (4) connection performance metrics of the connection; (5) telemetry data, including one or more of a speed, heading, altitude, coordinates, battery level, and system status of the autonomous robotic system; (6) mission status information indicating a status of the mission; and (7) a safety envelope description identifier, which identifies a current safety envelope description used by the autonomous robotic system.

4. The method of claim 2, wherein a message in the second set of messages includes a set of fields, wherein the set of fields includes one or more of (1) an autonomous robotic system identifier, which identifies the autonomous robotic system; (2) a remote-control center identifier, which identifies the remote-control center; (3) a sequence number of the message; (4) connection performance metrics of the connection, which indicate performance metrics for the connection based on a previous set of messages; and (5) remote-control center commands, including one or more of a confirmation command to confirm that the autonomous robotic system is to continue utilizing a current selected safety envelope description and corresponding operational parameters, a pause command to cause the autonomous robotic system to pause performance of the mission, an abort command to cause the autonomous robotic system to abort the mission, and an override command to cause the autonomous robotic system to use a new safety envelope description and corresponding operational parameters.

5. The method of claim 1, wherein the set of connection performance metrics indicate one or more of jitter, latency, throughput, and packet loss on the connection.

6. The method of claim 1, wherein the first set of operational parameters include one or more of a maximum velocity at which the autonomous robotic system is permitted to operate and a maximum altitude at which the autonomous robotic system is permitted to operate.

7. The method of claim 1, wherein the connection includes a first loop, which connects the autonomous robotic system to an intermediate control entity, and a second loop, which connects the intermediate control entity to the remote-control center, and wherein the set of connection performance metrics describe the first loop.

8. The method of claim 7, wherein the autonomous robotic system and the intermediate control entity exchange messages on the first loop at a first frequency, and the intermediate control entity and the remote-control center exchange messages on the second loop at a second frequency, and wherein the first frequency is greater than the second frequency.

9. The method of claim 1, further comprising:
determining, by the autonomous robotic system, a connection status for the connection based on the set of connection performance metrics;
performing, by the autonomous robotic system, a first corrective action in response to a first value of the connection status; and
performing, by the autonomous robotic system, a second corrective action in response to a second value of the connection status.

10. The method of claim 9, wherein the first value of the connection status indicates that the connection is inoperable, and the first corrective action is one of (1) the autonomous robotic system is to return to a designated location and (2) the autonomous robotic system is to halt and wait for further instructions.

11. A non-transitory computer-readable storage medium storing instructions which, when executed by a set of one or more processors of an autonomous robotic system that communicates with a remote-control center over a connection, cause the autonomous robotic system to:
determine a set of connection performance metrics, which indicate current performance characteristics of the connection between the autonomous robotic system and the remote-control center during a mission;
determine a first safety envelope description from a set of safety envelope descriptions for the autonomous robotic system based on the set of connection performance metrics, wherein the set of safety envelope descriptions are ranked from highest to lowest and wherein each safety envelope description in the set of safety envelope descriptions includes a mapping of connection performance metrics to operational parameters that define operating parameters for the autonomous robotic system, and the first safety envelope description maps the set of connection performance metrics to a first set of operational parameters, in which the first safety envelope description is determined by comparing the set of connection performance metrics with a highest-ranked safety envelope description in the set of safety envelope descriptions to determine a potential match before comparing the set of connection performance metrics with lower-ranked safety envelope descriptions in the set of safety envelope descriptions when a match with the highest-ranked safety envelope description is not achieved;
determine that the first set of operational parameters is different from a second set of operational parameters currently being used by the autonomous robotic system; and
apply, when the first set of operational parameters is different from the second set of operational parameters, the first set of operational parameters such that the first set of operational parameters govern operation of the autonomous robotic system during the mission.

12. The non-transitory computer-readable storage medium of claim 11, wherein the instructions further cause the autonomous robotic system to:
transmit a first set of messages to the remote-control center on the connection; and
receive a second set of messages from the remote-control center on the connection,
wherein the determining the set of connection performance metrics is based on one or more of (1) transmission of the first set of messages and (2) receipt of the second set of messages.

13. The non-transitory computer-readable storage medium of claim 12, wherein a message in the first set of messages includes a set of fields, wherein the set of fields includes one or more of (1) an autonomous robotic system identifier, which identifies the autonomous robotic system; (2) a remote-control center identifier, which identifies the remote-control center; (3) a sequence number of the message; (4) connection performance metrics of the connection; (5) telemetry data, including one or more of a speed, heading, altitude, coordinates, battery level, and system status of the autonomous robotic system; (6) mission status information indicating a status of the mission; and (7) a safety envelope description identifier, which identifies a current safety envelope description used by the autonomous robotic system.

14. The non-transitory computer-readable storage medium of claim 12, wherein a message in the second set of messages includes a set of fields, wherein the set of fields includes one or more of (1) an autonomous robotic system identifier, which identifies the autonomous robotic system; (2) a remote-control center identifier, which identifies the remote-control center; (3) a sequence number of the message; (4) connection performance metrics of the connection, which indicate performance metrics for the connection based on a previous set of messages; and (5) remote-control center commands, including one or more of a confirmation command to confirm that the autonomous robotic system is to continue utilizing a current selected safety envelope description and corresponding operational parameters, a pause command to cause the autonomous robotic system to pause performance of the mission, an abort command to cause the autonomous robotic system to abort the mission, and an override command to cause the autonomous robotic system to use a new safety envelope description and corresponding operational parameters.

15. The non-transitory computer-readable storage medium of claim 11, wherein the set of connection performance metrics indicate one or more of jitter, latency, throughput, and packet loss on the connection.

16. The non-transitory computer-readable storage medium of claim 11, wherein the first set of operational parameters include one or more of a maximum velocity at which the autonomous robotic system is permitted to operate and a maximum altitude at which the autonomous robotic system is permitted to operate.

17. The non-transitory computer-readable storage medium of claim 11, wherein the connection includes a first loop, which connects the autonomous robotic system to an intermediate control entity, and a second loop, which connects the intermediate control entity to the remote-control center, and wherein the set of connection performance metrics describe the first loop.

18. The non-transitory computer-readable storage medium of claim 17, wherein the autonomous robotic system and the intermediate control entity exchange messages on the first loop at a first frequency, and the intermediate control entity and the remote-control center exchange messages on the second loop at a second frequency, and wherein the first frequency is greater than the second frequency.

19. An autonomous robotic system, in which the autonomous robotic system is to be managed based on a status of a connection between the autonomous robotic system and a remote-control center that manages operation of the autonomous robotic system, comprising:
   a processor; and
   a memory (212B/804) coupled to the processor, wherein the memory includes instructions that when executed by the processor cause the autonomous robotic system to perform operations comprising:
      determine a set of connection performance metrics, which indicate current performance characteristics of the connection between the autonomous robotic system and the remote-control center during a mission;
      determine a first safety envelope description from a set of safety envelope descriptions for the autonomous robotic system based on the set of connection performance metrics, wherein the set of safety envelope descriptions are ranked from highest to lowest and wherein each safety envelope description in the set of safety envelope descriptions includes a mapping of connection performance metrics to operational parameters that define operating parameters for the autonomous robotic system, and the first safety envelope description maps the set of connection performance metrics to a first set of operational parameters, in which the first safety envelope description is determined by comparing the set of connection performance metrics with a highest-ranked safety envelope description in the set of safety envelope descriptions to determine a potential match before comparing the set of connection performance metrics with lower-ranked safety envelope descriptions in the set of safety envelope descriptions when a match with the highest-ranked safety envelope description is not achieved;
   determine that the first set of operational parameters is different from a second set of operational parameters currently being used by the autonomous robotic system; and
   apply, when the first set of operational parameters is different from the second set of operational parameters, the first set of operational parameters such that the first set of operational parameters govern operation of the autonomous robotic system during the mission.

\* \* \* \* \*